3,790,497
Patented Feb. 5, 1974

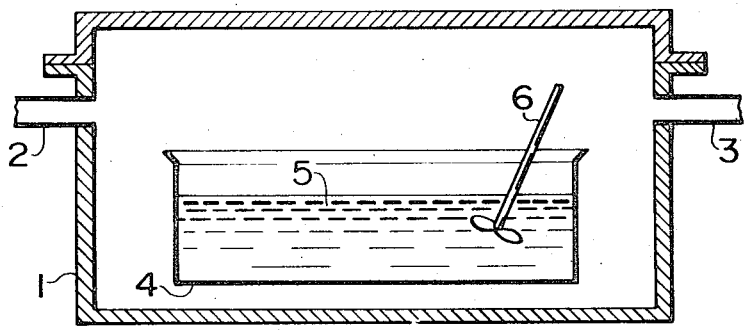

3,790,497
METHOD FOR PRODUCING WATER CONTAINING MICROCAPSULES
Hiroshi Sato, Munehiro Okumura, and Masujiro Arita, Hiroshima, Japan, assignors to Mitsubishi Rayon Company, Ltd., Tokyo, Japan
Filed Nov. 24, 1971, Ser. No. 201,896
Int. Cl. B01j 13/02; B44d 1/02
U.S. Cl. 252—316     24 Claims

ABSTRACT OF THE DISCLOSURE

Water containing microcapsules having wall superior in strength, thermal resistance as well as water retainability are produced by emulsifying an aqueous solution containing water soluble oxyacid salt of aluminium and other specific elements or hydrate thereof in an oily film forming liquid containing an organic acid to obtain a water-in-oil emulsion, re-emulsifying the emulsion in water containing a surface active agent to obtain an oil-in-water emulsion and hardening the film forming liquid layer of said oil-drops to form capsule wall. The microcapsules are useful for imparting antiflammability to fibers, films and so on.

---

This invention relates to a method for producing uniform and fine water containing microcapsules which comprise wall film having high strength, excellent heat resistance and excellent water retainability.

Conventionally, the following general methods were employed for producing spherical water-containing capsules. That is, (1) an aqueous solution containing a water soluble monomer is emulsified in an oil phase comprising an oil soluble monomer and a water immiscible organic solvent, and the monomers are polymerized at an interface between water and oil to form a polymer film. (2) Only either one of the oil soluble monomers or the water soluble monomers is used in the method (1) and the monomer is polymerized on the surfaces of water particles to form capsules. (3) Water is emulsified and dispersed in an oil phase comprising a water immiscible organic solvent solution containing a film forming organic polymer, then the dispersion is again emulsified and dispersed in water and thereafter the organic solvent is removed.

Disadvantages in these methods are as follows: in the process for emulsifying an aqueous phase in an oil phase, nothing is contrived than to use known surface active agents having a low HLB (hydrophile-lypophile balance). Therefore, the stability of a water-in-oil emulsion (reversed emulsion) obtained has a certain limitation and fine particles can hardly be obtained. Moreover, a large amount of water cannot be emulsified. Especially, in case of the method (3), water particles in the reversed emulsion are easily broken by the shearing force of stirring at a re-emulsification step and an amount of water retained in the dispersed oil-drops is extremely small. There are two modes, i.e. evaporation and an addition of non-solvents for the polymer, employed in order to remove the organic solvent from the oil phase in the case of (3) above. For the evaporation, the solvent should have a boiling point lower than water. For the addition of non-solvents, voids are easily formed in the wall film and difficulty is encountered in selecting the conditions for producing capsules having an indefectible wall film. Therefore, an amount of water in the thus obtained capsules is low and coarse capsules are easily formed. Furthermore, since only an organic high molecular material is used as the wall film, strength and heat resistance have limitations and the wall film is easily broken by merely heating around the boiling point of water to release water. In addition, even when capsules are allowed to stand at normal temperature, water gradually releases from the capsules to result in hollow capsules.

An object of this invention is to provide microcapsules having a strong wall film.

Another object of this invention is to provide water containing microcapsules having a high water content and showing a low water releasing property.

Still another object of this invention is to provide water containing microcapsules usable as a filler.

According to the present invention, an aqueous solution containing a water soluble salt of oxyacid of aluminum, boron, silicon, germanium, molybdenum, antimony, vanadium, tungsten, titanium, arsenic, zirconium, niobium, tin or tellurium, or hydrate thereof is emulsified in a film forming oily solution containing an organic acid film forming compound, e.g. an acid, to form a water-in-oil emulsion (reversed emulsion). The resultant reversed emulsion is re-emulsified in an aqueous solution containing a surface active agent to form an oil-in-water emulsion of oil drops. The oil drops have three layers, i.e., from inside to outside, aqueous solution/inorganic component/oily liquid (the resultant emulsion is referred to as triple emulsion hereinafter). Then, the oily liquid in the resultant triple emulsion is hardened to form capsule wall, whereby water containing fine capsules having a large amount of water are obtained.

The figure attached hereto shows a longitudinal section of one apparatus used for selective removal of an organic solvent from triple emulsion in this invention.

The method of this invention will be explained in more detail below.

(I) FORMATION OF A WATER-IN-OIL EMULSION

(a) Materials and processes

The examples of the film forming solution used in this invention are as follows:

(1) Solutions obtained by dissolving the following organic film forming compounds (B-1), (B-2), (B-3), (B-4) or (B-5) in one or more the following monomers A.

Monomers A—Vinyl monomers such as styrene, α-methylstyrene, o-methylstyrene, p-methylstyrene, and other styrene derivatives; methacrylic esters such as methyl methacrylate, ethyl methacrylate, butyl methacrylate, etc.; acrylic esters such as ethyl acrylate, etc.; vinyl acetate, vinyl chloride, acrylonitrile, divinyl benzene, ethylene glycol dimethacrylate, diethylene glycol dimethacrylate, tetraethylene glycol dimethacrylate, bis-(ethylene glycol)-phthalate dimethacrylate, etc.

Organic film forming compound (B-1)—Low molecular organic acid having molecular weight of 100–1000, such as capric acid, lauric acid, oleic acid, stearic acid, laurylsulfonate, laurylbenzenesulfonate, etc.

Organic film forming compound (B-2)—High molecular organic carboxylic acids having molecular weight above 1000, which are obtained by copolymerization of hydrophobic vinyl monomers such as styrene, styrene derivatives, methacrylic esters, acrylic esters, etc. and unsaturated carboxylic acid such as acrylic acid, methacrylic acid, maleic acid, methyl maleic acid, itaconic acid, methyl itaconic acid, etc.

Organic film forming compound (B-3)—Unsaturated polyesters obtained by condensation of unsaturated dicarboxylic acid such as maleic acid, fumaric acid, itaconic acid, etc. and polyhydric alcohols such as ethylene glycol, propylene glycol, etc.

Organic film forming compound (B-4)—Hydrolyzates or partial hydrolyzates of homopolymer containing unsaturated nitrile groups such as polyacrylonitrile, polymethacrylonitrile, etc.

Organic film forming compound (B–5)—High molecular organic sulfonic acid having molecular weight above 1000 such as copolymer of said hydrophobic vinyl monomers mentioned in B–2 and allylsulfonic acid, methallylsulfonic acid, styrenesulfonic acid, etc. or sulfonated products of homopolymer or copolymer containing styrene or styrene derivatives.

(2) Solutions obtained by dissolving said organic film forming compounds (B–1), (B–2), (B–3), (B–4) and (B–5) in partially polymerized syrup of said vinyl monomers A (syrupy mixture of monomer and polymer).

(3) Copolymer syrup of said vinyl monomers A and said unsaturated acid (syrupy mixture of monomer and copolymer).

(4) Solutions obtained by dissolving (i) a mixture of polymer of said vinyl monomer A and said organic film forming compounds [B–1 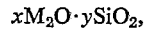5, or (ii) said high molecular organic film forming compound (B–2), (B–3), (B–4), (B–5)], alone in inert and water immiscible organic solvents such as benzene, xylene, carbon tetrachloride, chloroform, methylene monochloride, methylene dichloride, methylene trichloride, cyclohexane, etc.

The equivalent concentration of the acid groups in the organic film forming compound in the film forming liquid is not critical, but is preferably higher than 0.1 milliequivalent per 100 g. of said liquid.

In case of the solution using the non-polymerizable organic solvent, an amount of the film forming component in the liquid is preferably 2–20% by weight in view of emulsifiability and the properties of microcapsules obtained. Furthermore, in case of using a solution of the vinyl monomer, the known radical polymerization initiator such as benzoyl peroxide, lauroyl peroxide, azobisisobutyronitrile, etc. may be added, in order to accelerate the polymerization.

The water soluble oxyacid salts used in this invention are as follows:

(1) Sodium aluminum oxide, sodium orthoaluminate, sodium metaaluminate, barium aluminum oxide, barium aluminate, sodium metaborate, potassium metaborate, ammonium metaborate, sodium tetraborate, potassium tetraborate or hydrates thereof.

(2) Water soluble silicates having the formula $$xM_2O \cdot ySiO_2,$$

wherein M is an alkali metal or a quaternary ammonium group of $-NR_1R_2R_3R_4$ wherein $R_1$, $R_2$, $R_3$ and $R_4$ which may be same or different aliphatic residue, hydrogen, alicyclic residue or aromatic residue, $x$ is an integer of 1 to 5 and $y$ is an integer of 1 to 30. Hydrates of the silicates can also be used. Examples thereof are as follows: water glass (a sodium silicate of $x=1$ and $y=2-4$ in said formula), sodium orthosilicate, sodium sesquisilicate, sodium sesquisilicate hydrate, sodium metasilicate, sodium metasilicate hydrate, sodium disilicate, sodium trisilicate, sodium tetrasilicate, potassium metasilicate, potassium metasilicate hydrate, potassium disilicate, potassium disilicate hydrate, potassium tetrasilicate, potassium tetrasilicate hydrate, potassium orthosilicate, lithium orthosilicate, lithium metasilicate, lithium disilicate, lithium tetrasilicate, ammonium orthosilicate, ammonium metasilicate, tetraethanol ammonium metasilicate, sodium germanate, potassium molybdate, ammonium paramolybdate, potassium antimonate, sodium orthovanadate, potassium orthovanadate, lithium orthovanadate, ammonium metavanadate, sodium pyrovanadate, potassium pyrovanadate, lithium pyrovanadate, ammonium tetravanate, sodium polyvanadate, potassium polyvanadate, lithium polyvanadate, sodium tungstate, ammonium tungstate, sodium orthotitanate, sodium metatitanate, sodium dititanate, sodium polytitanate, sodium metaarsenite, potassium metaarsenite, lithium metaarsenite, sodium orthozirconate, ammonium orthozirconate, sodium metazirconate, ammonium metazirconate, sodium orthoniobate, sodium orthostannate, potassium orthostannate, sodium metastannate, potassium metastannate, sodium tellurate, sodium tellurite, potassium tellurite, or hydrates thereof.

The elements of the oxyacids are generally positioned, referring to Mendelejeff's Periodic Table, at crossings of Groups III or VI and periods of the same member as that of the group or one less than the number of the group, and atomic number is 74 at the most.

The above water soluble salt of oxyacid may be used alone or in a mixture of two or more. Especially, the silicate is preferable, because it is cheap. In preparing an aqueous solution of these compounds, other water soluble material such as, for example, dyestuff may be added, if necessary. An amount of said compounds in the aqueous solution may vary over a wide range, but preferably 0.1–50% by weight of water used. When the amount exceeds 50% by weight, the aqueous solution becomes too viscous and handling is difficult. When less than 0.1% by weight, the effect of this invention is insufficiently attained.

Regarding an amount of the aqueous solution of oxyacid salt to the film forming liquid, up to 9 volumes of the aqueous solution per 1 volume of the film forming liquid may be added, but 0.3–6 volumes of the aqueous solution per 1 volume of the film forming material is suitable in order to obtain suitable wall thickness of the microcapsules. Thus the film forming liquid and the aqueous solution of oxyacid salt are prepared.

Then, while the aqueous solution of the oxyacid salt is added dropwise to the film forming liquid or after the former is added to the latter, the mixture is only stirred to immediately obtain fine, uniform and stable reversed emulsion. Stirring by hand is sufficient for this purpose, but when dispersion of further fine particles is desired, high speed stirring by a mixer or homogenizer may be used.

As mentioned above, the reversed emulsion according to this invention is a dispersion of a kind of microcapsules obtained by wrapping fine water particles with a layer of a water-insoluble or hardly soluble oxyacid or oxide gel in the film forming liquid.

(b) Stability of emulsion

In order to form the reversed emulsion in this invention, substantially no reversed emulsifier is required beside the water soluble oxyacid salt. The oxyacid salt in the aqueous solution and the organic film forming compound, e.g. an acid, in the oily liquid react at the interface of water-oil to produce water insoluble or hardly soluble gel of oxyacid or oxide. This gel wraps fine particles of water to mechanically stabilize the interface. Simultaneously, the produced organic acid salt acts as a surface active agent to reduce free energy at the water-oil interface to further stabilize the interface.

The extremely high stability of the reversed emulsion of this invention mainly owes to formation of said gel and secondly to formation of organic acid salt. When an aqueous solution of caustic soda or caustic potash is added at the time of emulsification of water in the film forming liquid, a water-in-oil emulsion (reversed emulsion) may be produced, but diameter of water particles which are dispersion phase is large and water is easily removed when allowed to stand. On the other hand, the reversed emulsion obtained by the method of this invention has small particle size and no water is removed even allowed to stand for a long period of time.

Furthermore, in case of producing a reversed emulsion using an aqueous solution containing an alkali metal hydroxide or an organic amine, the form of the emulsion changes depending upon amount of the alkali metal hydroxide or the organic amine added, namely, conversion from water-in-oil to oil-in-water occurs. However, no such phenomenon are seen in the method of this invention and an amount of oxyacid salt added may vary over a wide range, and, in addition, highly stable reversed emulsion can be obtained.

In case of using alkali metal hydroxide or organic amine, conversion of phase is caused by increasing temperature of the emulsion, while no effect of temperature is seen in the method of this invention.

Stable emulsion can be obtained even when the organic acid compound in the film forming liquid is such organic carboxylic acid as oleic acid, lauric acid etc., which behave as an emulsifier for an oil-in-water emulsion after neutralized with alkali or saponification.

The above facts are extremely important points for obtaining excellent water containing microcapsules.

(II) Re-emulsification

The reversed emulsion in this invention is a stable emulsion essentially possessing the properties as an oily liquid. Therefore, such emulsion can be easily re-emulsified in an aqueous solution containing a surface active agent in accordance with the same principle as in the case of forming the usual oil-in-water emulsion. In this case, the particles in the reversed emulsion are not broken at all even under a high shearing force and retained in the film forming liquid. Preferable surface active agents used in this re-emulsifying step are those which make easy the formation of the usual oil-in-water emulsion and contribute to stabilization of the emulsion. Examples of the surface active agents are as follows: anionic active agents such as sodium alkylsulfate, ammonium alkylsulfate, sodium alkylallylsulfonate, sodium alkyl naphthalenesulfonate, polyoxyethylenealkylphenyl ether, sodium alkylsulfonate, sodium alkylphosphate, etc.; cationic active agents such as alkylamine salts, alkyldimethylamine, salts, alkylpyridinium chloride, alkylamidemethylpyridinium chloride, etc.; non-ionic active agents such as polyoxyethylenealkyl ether, polyoxyethylene alkylphenol ether, polyoxyethylene alkyl ester, etc. A mixture of these agents may also be used. Especially, anionic and cationic active agents are preferred, because stabilization action thereof is not lost in heat treatment.

Concentration of the aqueous solution of the surface active agents as a dispersion medium may be optionally selected depending upon the diameter of capsules desired. Generally, a concentration of about 0.1–8% by weight is preferable. It is necessary that an amount of said aqueous solution is at least equal to that of the reversed emulsion to be emulsified.

The reversed emulsion is added at a time or little by little to said aqueous solution while rapidly stirring the solution. Even after completion of the addition, the stirring is continued for another several minutes. Thus, the re-emulsification is completed.

The particles in the reversed emulsion are not utterly broken by such high speed stirring. Therefore, the reversely emulsified water is not lost.

Thus obtained emulsion has such form that spherical particles having triple structure, namely, a uniform fine water drop is covered with a film of the inorganic component and then further covered thereon with the film forming liquid, are dispersed in water.

(III) FORMATION OF MICROCAPSULES

Formation of capsules is finally attained by hardening of the film forming liquid layer in the emulsion formed in said re-emulsification step. In case of using the solution of vinyl monomer, the wall of capsules can be formed by the polymerization of the monomer. In case of previously having the catalyst added to the solution, the emulsion is only heated to a temperature lower than 100° C. and slowly stirred. Ionizing radiation such as with $\alpha$-, $\beta$- and $\gamma$-rays and electron rays may also be used, for the hardening, wherein the triple emulsion is spread on a support and is subjected to irradiation.

In case of a solution with an inert organic solvent, capsules can be obtained by removing the organic solvent to leave the film forming material which is the solute, on the surface of the particles. For removal of the organic solvent, a liquid which is a non-solvent to the film forming material and is miscible with water is added. Alternatively, the organic solvent is evaporated by warming the emulsion and stirring slowly under normal pressure or reduced pressure. In the former method, however, the capsule wall easily becomes porous. In the latter method it takes a long time for removal of the organic solvent which is present in the oil-in-water emulsion. For, the treatment should be carried out at lower temperature. Especially, in case of using an organic solvent having a boiling point higher than that of water, removal of the organic solvent is very difficult by merely heating or warming said emulsion, because water is more easily evaporated. Even if the organic solvent can be removed, an amount of water in capsules becomes low and in some time, the capsule wall is greatly deformed or broken. A preferable method for removing the organic solvent is that the triple emulsion is retained in a heated and saturated steam which is continuously supplied and discharged using a drying bath as shown in the accompanying drawing. According to this method, only the organic solvent is selectively removed and extremely dense wall film of polymer can be formed. That is, inside of drying bath 1 is kept at a constant temperature and pressure with the heated saturated steam which is continuously supplied and discharged from an inlet 2 and an outlet 3. Triple emulsion 5 filled in a vessel 4 is placed in said drying bath 1 and is slowly stirred with a stirrer 6 to selectively remove the organic solvent. This selective removal of the organic solvent seems to be caused by the following reason, namely, since the aqueous phase inside and outside the emulsion particles is always kept at saturated vapor pressure of water, evaporation of water hardly occurs, while the organic solvent evaporated is continuously removed with the steam and always kept at unsaturated vapor pressure of said organic solvent.

(IV) SEPARATION OF MICROCAPSULES

After completion of hardening step, an aqueous dispersion or a slurry of water containing microcapsules is obtained. Various methods can be employed for separating the water-containing microcapsules. A simple method is that the microcapsules centrifugally separated from said dispersion or the slurry are washed with water, further centrifugally separated and spread on a support to be ari-dried. Other methods are those wherein a polyvalent metal salt or inorganic acid is added to aggregate the microcapsules, which are filtered, washed with water and dried or the dispersion or the slurry iself is spray dried.

Thus separated microcapsules are uniform and fine water containing microcapsules having double walls consisting of inner wall of oxyacid or oxide of aluminum, boron, silicon, germanium, molybdenum, antimony, vanadium, tungsten, titanium, arsenic, zirconium, niobium, tin, or tellurium and outer wall of organic high molecular material. Therefore, these microcapsules have high strength, extremely excellent heat resistance and water retainability and high water content. Furthermore, the aqueous slurry or the spray-dried microcapsules can be easily dispersed in water. On the other hand, even microcapsules washed with water to remove surface active agents and then dried can be re-dispersed in an organic medium.

The water containing microcapsules obtained by this invention are useful for imparting antiflammability to fibers or plastics. The microcapsules obtained by the conventional methods are coarse and tend to be broken at admixing with and dispersing in other materials and cannot be used. On the other hand, the water containing microcapsules obtained by the method of this invention can be uniformly dispersed in fibers, film or coating, and can impart excellent antiflammability thereto. This effect is based on the synergistic action of inorganic component and heat of vaporization taken away when the capsule wall is broken at combustion and water is evaporated.

The microcapsules obtained by the method of this invention can also be used for the purpose that they are dispersed in a material such as diisocyanate which reacts with water to be cured and they are kept for a long period of time as a curing mixture at normal temperature. Moreover, a curing agent, a dyestuff, a photosensitizer, an enzyme, etc. which are encapsuled according to the method of this invention can be used for various fields such as fibers, plastics, photograph, printing, foods, medicines, agricultural chemicals, etc.

Parts and percent in the following examples are based on weight. The water content referred to in the examples is calculated in accordance with the following formula:

$$\text{Water content (percent)} = \frac{W - W_o}{W_o} \times 100$$

wherein, $W_o$ and $W$ are weights of capsules untreated and heated at 300° C. for one hour, respectively.

Aqueous phases used in the examples are listed up in Table 1.

TABLE 1

Aqueous phase

1 ---- 2% aqueous solution of sodium silicate.
2 ---- 5% aqueous solution of sodium silicate.
3 ---- 10% aqueous solution of sodium silicate.
4 ---- 20% aqueous solution of sodium silicate.
5 ---- 30% aqueous solution of sodium silicate.
6 ---- 5% aqueous solution of ammonium metasilicate.
7 ---- 8% aqueous solution of ammonium metasilicate.
8 ---- 5% aqueous solution of lithium metasilicate.
9 ---- 5% aqueous solution of potassium metasilicate.
10 ---- 3% aqueous solution of sodium metaborate.
11 ---- 5% aqueous solution of sodium metaborate.
12 ---- 10% aqeous solution of sodium metaborate.
13 ---- 5% aqueous solution of sodium aluminate.
14 ---- 10% aqueous solution of sodium aluminate.
15 ---- 20% aqueous solution of sodium aluminate.
16 ---- 10% aqueous solution of sodium titanate.
17 ---- 5% aqueous solution of potassium orthovanadate.
18 ---- 5% aqueous solution of sodium germanate.
19 ---- 5% aqueous solution of potassium arsenite.
20 ---- 5% aqueous solution of sodium orthozirconate.
21 ---- 2% aqueous solution of sodium niobate.
22 ---- 5% aqueous solution of ammonium molybdate.
23 ---- 5% aqueous solution of sodium stannate.
24 ---- 2% aqueous solution of potassium antimonate.
25 ---- 5% aqueous solution of sodium tellurate.
26 ---- 5% aqueous solution of ammonium tungstate.
27 ---- 1% aqueous solution of caustic potash.
28 ---- Deionized water.

NOTE: The aqueous solution of sodium silicate was prepared by diluting commercially available water glass with deionized water.

EXAMPLE 1

Eight parts of methyl methacrylate-methacrylic acid copolymer having a molecular weight of 95,000 and acid equivalent of $1.29 \times 10^{-4}$ eq./g. was dissolved in 92 parts of benzene to obtain an oil phase solution. To 50 ml. of thus obtained solution was added 15 ml. of each of aqueous phases No. 3, No. 4, No. 5, No. 11, No. 13, No. 18 and No. 22 in Table 1. Thus obtained mixtures were stirred at a speed of 3000 r.p.m. for 2 minutes with a homomixer to obtain respective reversed emulsions. Then, each reversed emulsion was added dropwise in 3 minutes to 150 ml. of 5% aqueous solution of sodium salt of polyoxyethylenenonyl phenylethersulfate while stirring at 5000 r.p.m. with a homomixer. After completion of the addition, stirring is carried out for further 3 minutes to obtain triple emulsion comprising extremely uniform and fine particles. This triple emulsion was heated to 70° C and slowly stirred. After lapse of 3 hours, benzene was completely removed to obtain an aqueous slurry of microcapsules. The microcapsules were separated with a centrifugal separator and washed with deionized water and then dried to obtain spherical water containing microcapsules of less than $5\mu$ in diameter in powdery form.

For comparison, the same procedure as mentioned above was repeated using deionized water (No. 28) in place of the aqueous solution of the oxyacid salts to obtain microcapsules.

Properties of these microcapsules are shown in Table 2.

TABLE 2

| Aqueous phase used | Water content (percent by weight) | | | State after heating at 100° C. for one hour |
|---|---|---|---|---|
| | Immediately after formation | After allowing to stand at normal temperature for one week | After heating at 160° C. for one hour | |
| No. 3 | 68.3 | 68.3 | 67.9 | No change. |
| No. 4 | 60.0 | 60.0 | 59.7 | Do. |
| No. 5 | 51.7 | 51.7 | 51.6 | Do. |
| No. 11 | 67.0 | 67.0 | 66.5 | Do. |
| No. 13 | 67.8 | 67.8 | 67.4 | Do. |
| No. 18 | 68.0 | 68.0 | 67.5 | Do. |
| No. 22 | 68.8 | 68.8 | 68.2 | Do. |
| No. 28 | 30.2 | 17.8 | ~0 | No original shape was retained. |

As is clear from the above results, the microcapsules obtained using aqueous solutions of oxyacid salts had high water content and markedly excellent heat resistance. In case of sodium silicate, the water content decreased with increase of the concentration. This is due to the fact that specific gravity of sodium silicate is high.

The fact that the water content of the microcapsules obtained using the deionized water was low will be due to the fact that since stability of the reversed emulsion is low, the emulsion is broken at re-emulsification and previously reversely emulsified water flowed out and finally mere polymer particles were contained in a considerable amount.

EXAMPLE 2

6.5 parts of styrene-methacrylic acid copolymer having a molecular weight of 113,000 and an acid equivalent of $3.12 \times 10^{-4}$ eq./g. was dissolved in 93.5 parts of toluene to obtain an oil phase solution. To 50 ml. of thus obtained oil phase solution was added 15 ml. of each of aqueous phases No. 7, No. 9, No. 11, No. 14, No. 16 and No. 19 shown in Table 1. The resultant mixtures were respectively stirred for 5 minutes at a speed of 100 r.p.m. with a homomixer to form reversed emulsions. Then, these emulsions were respectively added dropwise to 150 ml. of 5% aqueous solution of sodium dedecylsulfate in 3 minutes while stirring at a speed of 4000 r.p.m. with a homomixer. After completion of the addition, stirring was carried out for further 3 minutes to obtain extremely uniform and fine triple emulsions. These emulsions were respectively placed in the drying bath shown in the drawing and slowly stirred while flowing saturated steam at 90° C. through the bath to completely remove toluene for about 3 hours. Then, the emulsions were respectively spray dried at 70° C. with a spray drier. Thus obtained powders were sufficiently washed with methanol and then were dried at 50° C. to obtain fine powders of water containing microcapsules.

The properties of thus obtained microcapsules are shown in Table 3.

TABLE 3

| Aqueous phase used | Average particle diameter (μ) | Water content (percent) | | | State after heating at 100° C. for one hour |
|---|---|---|---|---|---|
| | | Immediately after formation | After allowing to stand at normal temperature for one week | After heating at 100° C. for one hour | |
| No. 7 | 5.0 | 74.0 | 73.9 | 73.6 | No change. |
| No. 9 | 5.3 | 75.2 | 75.0 | 74.7 | Do. |
| No. 11 | 5.5 | 74.1 | 74.1 | 73.7 | Do. |
| No. 14 | 3.0 | 73.3 | 73.3 | 73.0 | Do. |
| No. 16 | 4.0 | 72.7 | 72.7 | 72.2 | Do. |
| No. 19 | 4.4 | 73.1 | 73.1 | 72.6 | Do. |
| No. 28 | | 27.5 | 18.3 | ~0 | Polymer powders having irregular shape. |

For comparison, the same procedure as mentioned above was repeated using deionized water of No. 28 instead of an aqueous solution of the oxyacid salts. The results thereof are also shown in Table 3. The reason for the low water content in this case will be that since the reversed emulsion was unstable, water to be encapsuled in particles flowed out into dispersion medium by shearing force at re-emulsification step and as the result, mere polymer particles were contained in a considerable amount.

Furthermore, when toluene in the oil phase was removed by heating the triple emulsion to 80° C. and slowly stirring it without using the drying bath, water in the dispersion medium was also evaporated with toluene to result in concentration of the emulsion and hence, hot water at 80° C. must be occasionally added. Thus, complete removal of toluene required about 4 hours. The microcapsules obtained using aqueous phases No. 11, No. 14 and No. 16 had a water content of 67.3%, 66.2% and 64.5%, respectively. These water contents were somewhat lower than those of the microcapsules obtained using the drying bath. However, they had excellent heat resistance and water retainability.

EXAMPLE 3

Forty parts of styrene and 20 parts of ethylene glycol dimethacrylate were added to 40 parts of a syrupy mixture of monomers/polymers obtained by polymerizing 95 parts of styrene, 5 parts of methylmaleic acid and 0.5 part of azoisobutyronitrile at 60° C. for 2 hours. Reversed emulsions were prepared from 50 ml. of the resultant mixture and 60 ml. of aqueous phases No. 3, No. 11, No. 12, No. 14, No. 17, No. 20, No. 23 and No. 26 shown in Table 1, respectively. 0.3 gram of lauroyl peroxide as a catalyst was dissolved in respective reversed emulsion. These reversed emulsions were respectively added dropwise to 200 ml. of previously prepared 5% aqueous solution of sodium salt of polyoxyethylene nonylphenyl ether-sulfate in 5 minutes while stirring at a speed of 5000 r.p.m. with a homomixer. After completion of the addition, stirring was continued for further 5 minutes to obtain triple emulsions comprising extremely uniform and fine particles.

These emulsions were respectively introduced into a round bottom flask provided with a cooling tube and heated to 70° C. and slowly stirred for 6 hours to complete polymerization and hardening of the oil phase. Aqueous slurries of water containing microcapsules were thus obtained.

These slurries were respectively subjected to centrifugal separation to separate the microcapsules, which were sufficiently washed with methanol and then dried at 50° C. to obtain fine powders of water containing microcapsules.

For comparison, the same procedure as mentioned above was repeated using 1% aqueous solution of caustic potash (No. 27) instead of said oxyacid salt to obtain water containing microcapsules.

The properties of these microcapsules are shown in Table 4.

TABLE 4

| Aqueous phase used | Average particle diameter (μ) | Water content (percent) | |
|---|---|---|---|
| | | Immediately after formation | After heating at 100° C. for one hour |
| No. 3 | 4.4 | 52.6 | 52.2 |
| No. 11 | 4.2 | 51.3 | 51.0 |
| No. 12 | 4.5 | 50.1 | 49.7 |
| No. 14 | 4.6 | 51.8 | 51.2 |
| No. 17 | 3.3 | 52.0 | 51.2 |
| No. 20 | 3.9 | 51.9 | 51.1 |
| No. 23 | 4.1 | 50.9 | 50.3 |
| No. 26 | 3.6 | 52.7 | 50.8 |
| No. 27 | 3.4 | 6.2 | ~0 |

The reason why the water content of the capsules obtained using aqueous solution of caustic potash was extremely low is that phase inversion phenomenon of reversed emulsion occurred at the re-emulsification step and finally the capsules became merely hardened resin particles.

EXAMPLE 4

In a syrupy mixture of monomer/polymer having a conversion of 5% which was obtained by polymerizing 95 parts of methyl methacrylate, 5 parts of acrylic acid and 0.2 part of azobisisobutyronitrile was additionally dissolved 0.2 part of azobisisobutyronitrile. To 50 ml. of thus obtained mixtures were added 60 ml. of each of aqueous phases No. 1, No. 10, No. 21 and No. 22 and each mixture was stirred at a speed of 4000 r.p.m. for 2 minutes with a homomixer to obtain reversed emulsion. Each of the reversed emulsions was reemulsified in 5% aqueous solution of sodium dodecyl benzene sulfonate to obtain uniform and fine triple emulsion.

The oil phase in thus obtained emulsion was treated in the same way as Example 3 to obtain an aqueous slurry of water containing microcapsules. A 7% aqueous solution of calcium chloride was added to each of said slurry to aggregate and precipitate the water containing microcapsules, which were filtered out and sufficiently wash with water and then dried to obtain fine powders of water containing microcapsules. The properties of these microcapsules were excellent as shown in Table 5.

TABLE 5

| Aqueous phase used | Average particle diameter (μ) | Water content (percent) | |
|---|---|---|---|
| | | Immediately after formation | After heating at 100° C. for one hour |
| No. 1 | 2.0 | 52.1 | 51.5 |
| No. 10 | 2.2 | 51.7 | 51.1 |
| No. 21 | 3.1 | 51.9 | 51.2 |
| No. 22 | 4.0 | 48.9 | 48.3 |

EXAMPLE 5

70 parts of unsaturated polyester (acid value 60) obtained using phthalic anhydride, maleic anhydride and propylene glycol in a molar ratio of 3:2:5 and 30 parts of styrene were mixed to obtain oil phase solution. To 50 ml. of thus obtained solutions were added 60 ml. of aqueous phase No. 3, No. 11, No. 12, No. 13, No. 17, No. 20, No. 24, and No. 25, respectively. Each of thus obtained mixture was stirred at a speed of 3000 r.p.m. for 3 minutes with a homomixer to obtain reversed emulsion. 0.5 gram of lauroyl peroxide was added to each of thus obtained reversed emulsions and the mixture was slowly stirred to homogeneously dissolve them. Each of thus obtained solutions was added dropwise to 200 ml. of 5% aqueous solution of sodium salt of polyoxyethylenenonyl phenyl ether-sulfate in 5 minutes, during which stirring was effected at a speed of 5000 r.p.m. with a homomixer. After completion of the addition, the stirring was continued for further 5 minutes to obtain triple emulsion comprising extremely uniform and fine particles.

Each of the emulsions was placed in a round bottom flask provided with a cooling tube, then heated to 70° C. and slowly stirred for 5 hours to complete cross-linking hardening of oil phase. Thus aqueous slurries of water containing microcapsules were obtained.

Each of these slurries were subjected to centrifugal separation to separate the microcapsules, which were sufficiently washed with methanol and then dried at 50° C. to obtain fine powders of water containing microcapsules. The properties of these microcapsules are shown in Table 6.

TABLE 6

| Aqueous phase used | Average particle diameter ($\mu$) | Water content (percent) | |
|---|---|---|---|
| | | Immediately after formation | After heating at 100° C. for one hour |
| No. 3 | 4.3 | 51.3 | 51.0 |
| No. 11 | 3.2 | 51.0 | 50.5 |
| No. 12 | 3.9 | 50.2 | 49.6 |
| No. 13 | 3.8 | 50.0 | 50.0 |
| No. 17 | 3.0 | 51.2 | 50.8 |
| No. 20 | 4.1 | 51.3 | 50.8 |
| No. 24 | 3.2 | 52.0 | 51.4 |
| No. 25 | 3.9 | 51.2 | 50.6 |

For comparison, the above mentioned procedure was repeated except that deionized water was used instead of said aqueous solutions of oxyacid salts and 5 parts of polyethylene glycol nonylphenyl ether (HLB 3.3) which was the optimum emulsifier for obtaining reversed emulsion was used per 100 parts of oil phase. Thus water containing microcapsules were obtained. The water content of said capsules was 18.5%, which was reduced to 10.2% when allowed to stand at normal temperature for one week. Water was completely released by heating at 100° C. for one hour.

EXAMPLE 6

Triple emulsion was obtained by repeating the procedure of Example 5 except that re-emulsification of reversed emulsion which used aqueous phase No. 13 was immediately carried out without adding lauroyl peroxide to the reversed emulsion.

Said triple emulsion was spread on a glass plate and was irradiated with an ionizing radiation of 30 mrad./sec. in dose rate and 40 mrad. in total dose to allow the oil phase in the triple emulsion to be cross-linked and hardened.

To aqueous slurry of water containing microcapsules obtained by gathering up said irradiated substance was added 7% aqueous solution of calcium chloride to aggregate and precipitate microcapsules, which were filtered out, then sufficiently washed with water and methanol and dried at 50° C. to obtain fine powders of spherical water containing microcapsules having an average diameter of 2.7$\mu$.

These microcapsules had a water content of 52.3% and were excellent in water retainability and heat resistance.

EXAMPLE 7

70 parts of unsaturated polyester (acid value 56) obtained using dimethacrylic acid, phthalic anhydride and propylene glycol in a molar ratio of 2:3:5, respectively and 30 parts of methyl methacrylate were mixed to obtain an oil phase solution. 0.5 gram of lauroyl peroxide was added to 50 ml. of said solution to obtain homogeneous solution. Seventy milliliters of each of aqueous phases No. 2, No. 6, No. 8, No. 9, No. 11, No. 13, No. 17, No. 23 and No. 26 was added to said solution and each of thus obtained mixtures was stirred at a speed of 3000 r.p.m. for 5 minutes to obtain reversed emulsion comprising uniform and fine aqueous particles. Then, each of said reversed emulsions was added dropwise to 5% aqueous solution of sodium dodecyl benzene sulfonate in 3 minutes while stirring at a speed of 7000 r.p.m. with a homomixer. After completion of the addition, stirring was effected for further 5 minutes to obtain uniform and fine triple emulsion.

The oil phase in said emulsion was hardened by the same method as in Example 5 to obtain aqueous slurry of water containing microcapsules.

Said slurry was spray dried at 70° C. and sufficiently washed with methanol. Thereafter, the slurry was dried at 50° C. to obtain fine powders of water containing microcapsules.

Properties of thus obtained microcapsules are shown in Table 7.

TABLE 7

| Aqueous phase used | Average particle diameter ($\mu$) | Water content (percent) | |
|---|---|---|---|
| | | Immediately after formation | After heating at 100° C. for one hour |
| No. 2 | 2.3 | 53.2 | 52.7 |
| No. 6 | 3.0 | 51.4 | 50.8 |
| No. 8 | 4.2 | 53.0 | 52.2 |
| No. 9 | 3.1 | 52.5 | 52.0 |
| No. 11 | 2.7 | 53.0 | 52.2 |
| No. 13 | 3.4 | 52.3 | 51.8 |
| No. 17 | 4.0 | 52.9 | 52.2 |
| No. 23 | 3.8 | 51.5 | 50.6 |
| No. 26 | 4.5 | 51.4 | 50.8 |

For comparison, the same procedure as mentioned above was repeated except that 1% aqueous solution of caustic soda was used instead of said aqueous solutions of oxyacid salt to obtain water containing microcapsules.

The water content of thus obtained microcapsules was 9.3%. The reason for such extremely low water content is that a phase inversion of reversed emulsion was caused at re-emulsification step and the capsules were finally mere hardened resin particles.

What is claimed is:

1. A method for producing water containing microcapsules which comprises emulsifying an aqueous solution containing at least one of the water soluble salts of oxyacid of an element selected from the group consisting of aluminum, boron, silicon, germanium, molybdenum, antimony, vanadium, tungsten, titanium, arsenic, zirconium, niobium, tin and tellurium and/or hydrates thereof in an oily film forming liquid substantially containing a film forming organic compound selected from the group consisting of (1) an organic acid selected from the group consisting of higher fatty acid and sulfonic acid having molecular weight of 100–1000, (2) a high molecular weight organic acid having molecular weight above 1000 obtained by copolymerizing a hydrophobic vinyl monomer and unsaturated carboxylic acid and/or unsaturated sulfonic acid, (3) an unsaturated polyester obtained by condensation of unsaturated dibasic acid and polyhydric alcohol, and (4) hydrolyzates or partial hydrolyzates of homopolymer containing unsaturated nitrile groups, to form a water-in-oil emulsion, whereby the oxyacid salt in the aqueous solution and the film forming compound in the oily liquid react at the interface of the water and oil to produce a water insoluble or hardly soluble gel which wraps fine particles of water to stabilize the interface and the resultant organic acid salt acts as a surface active agent to further stabilize the interface, then re-emulsifying said emulsion in an aqueous solution containing surface active agent to form a triple emulsion comprising (aqueous liquid/inorganic component/film forming liquid)/water and thereafter hardening the film forming liquid layer.

2. A method according to claim 1, wherein said film forming organic compound is an acid selected from the group consisting of higher fatty acid and sulfonic acid having molecular weight of 100–1000.

3. A method according to claim 1, wherein said film forming organic compound is a high molecular weight organic acid having molecular weight above 1000 obtained by copolymerizing a hydrophobic vinyl monomer and unsaturated carboxylic acid and/or unsaturated sulfonic acid.

4. A method according to claim 1, wherein said film forming organic compound is an unsaturated polyester obtained by condensation of unsaturated dibasic acid and polyhydric alcohol.

5. A method according to claim 1, wherein a solution obtained by dissolving the film forming organic compound in an inert organic solvent immiscible with water is used as the film forming liquid and said inert organic solvent is removed at hardening of the film forming liquid layer in the triple emulsion.

6. A method according to claim 5, wherein at removal of the inert solvent the triple emulsion is kept in an atmosphere of heated saturated steam which is continuously supplied and discharged.

7. A method according to claim 1, wherein a solution obtained by dissolving an oil soluble film forming organic compound in a polymerizable vinyl monomer is used as the film forming liquid, and said vinyl monomer is polymerized at the hardening of the film forming liquid layer in the triple emulsion.

8. A method according to claim 7, wherein the triple emulsion is irradiated with ionizing radiation at polymerization and hardening.

9. A method according to claim 1, wherein an aluminate selected from the group consisting of sodium aluminate (sodium aluminum oxide) and barium aluminate (barium aluminum oxide) is used as the oxyacid salt.

10. A method according to claim 1, wherein a borate selected from the group consisting of potassium borate, sodium borate and ammonium borate is used as the oxyacid salt.

11. A method according to claim 1 wherein the oxyacid salt of silicon is a silicate and/or hydrate thereof having the general formula $xM_2O \cdot ySiO_2$ (wherein M is an alkali metal or a quaternary ammonium group represented by $-NR_1R_2R_3R_4$ wherein $R_1$, $R_2$, $R_3$ and $R_4$ may be the same or different and represent hydrogen atom, aliphatic residue, alicyclic residue or aromatic residue, $x$ is an integer of 1 to 5 and $y$ is an integer of 1 to 30).

12. A method according to claim 1, wherein sodium germanate is used as the oxyacid salt.

13. A method according to claim 1, wherein the oxyacid salt is selected from the group consisting of potassium molybdate and ammonium molybdate.

14. A method according to claim 1, wherein the oxyacid salt is potassium antimonate.

15. A method according to claim 1, wherein the oxyacid salt is a vanadate selected from the group consisting of sodium vanadate, potassium vanadate, lithium vanadate and ammonium vanadate.

16. A method according to claim 1, wherein the oxyacid salt is a tungstate selected from the group consisting of sodium tungstate and ammonium tungstate.

17. A method according to claim 1, wherein the acid group equivalent concentration in the film forming compound in the film forming liquid is higher than 0.1 milliquivalent per 100 g. of the film forming liquid.

18. A method according to claim 1, wherein concentration of the aqueous solution of the oxyacid salt used in forming the water-in-oil emulsion is 0.1–50% by weight.

19. A method according to claim 1, wherein amount of the aqueous solution of the oxyacid salt used in forming the water-in-oil emulsion is 0.3–6 volume per 1 volume of the film forming liquid.

20. A method according to claim 5, wherein concentration of the film forming component in the film forming liquid is 2–20% by weight.

21. A method for producing water containing microcapsules which comprises emulsifying an aqueous solution containing at least one of the water soluble salts of oxyacid of an element having an atomic number of at most 74 and being positioned at crossing of group numbers of III to VI and period numbers whose number is equal to one less than the number of the group, in the periodic table and hydrates thereof in an oily film forming liquid substantially containing a film forming organic compound selected from the group consisting of (1) an organic acid selected from the group consisting of higher fatty acid and sulfonic acid having molecular weight of 100–1000, (2) a high molecular weight organic acid having molecular weight above 1000 obtained by copolymerizing a hydrophobic vinyl monomer and unsaturated carboxylic acid and/or unsaturated sulfonic acid, (3) an unsaturated polyester obtained by condensation of unsaturated dibasic acid and polyhydric alcohol, and (4) hydrolyzates or partial hydrolyzates of homopolymer containing unsaturated nitrile groups, to form a water-in-oil emulsion, whereby the oxyacid salt in the aqueous solution and the film forming compound in the oily liquid react at the interface of the water and oil to produce a water insoluble or hardly soluble gel which wraps fine particles of water to stabilize the interface and the resultant organic acid salt acts as a surface active agent to further stabilize the interface, then re-emulsifying said emulsion in an aqueous solution containing surface active agent to form a triple emulsion comprising (aqueous liquid/inorganic component/film forming liquid)/water and thereafter hardening the film forming liquid layer.

22. A method according to claim 21, wherein said film forming organic compound is selected from the group consisting of higher fatty acid and sulfonic acid having molecular weight of 100–1000.

23. A method according to claim 21, wherein said film forming organic compound is a high molecular weight organic acid having molecular weight above 1000 obtained by copolymerizing a hydrophobic vinyl monomer and unsaturated carboxylic acid and/or unsaturated sulfonic acid.

24. A method according to claim 21, wherein said film forming organic compound is an unsaturated polyester obtained by condensation of unsaturated dibasic acid and polyhydric alcohol.

References Cited

UNITED STATES PATENTS

| | | | |
|---|---|---|---|
| 3,242,051 | 3/1966 | Hiestand et al. | 252—316 X |
| 3,386,851 | 6/1968 | Harlan | 117—100 B X |
| 3,405,070 | 10/1968 | Reyes | 252—316 |
| 3,523,906 | 8/1970 | Vrancken et al. | 252—316 |

RICHARD D. LOVERING, Primary Examiner

U.S. Cl. X.R.

71—64 F; 117—62, 100 B; 252—8.1, 194, 314; 264—4; 424—33